US008482756B2

(12) United States Patent
Kai

(10) Patent No.: US 8,482,756 B2
(45) Date of Patent: Jul. 9, 2013

(54) INFORMATION PROCESSING APPARATUS AND PRINTING CONTROL APPARATUS STORING RECORDING MATERIAL INFORMATION CORRESPONDING TO A SHIPPING DESTINATION OF THE PRINTER FOR RESPECTIVE SHIPPING DESTINATION AREAS

(75) Inventor: Hiroshi Kai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1107 days.

(21) Appl. No.: 11/449,622

(22) Filed: Jun. 9, 2006

(65) Prior Publication Data

US 2007/0002355 A1   Jan. 4, 2007

(30) Foreign Application Priority Data

Jun. 30, 2005   (JP) ................................. 2005-193087

(51) Int. Cl.
*G06F 3/12*   (2006.01)
(52) U.S. Cl.
USPC .......... 358/1.15; 358/1.9; 358/1.16; 358/3.23
(58) Field of Classification Search
USPC ................... 358/1.15; 719/311–327
See application file for complete search history.

(56) References Cited

U.S. PATENT DOCUMENTS

| 7,072,063 | B2 | 7/2006 | Moriyama et al. | |
|---|---|---|---|---|
| 2001/0019343 | A1* | 9/2001 | Walker et al. | 347/19 |
| 2004/0156071 | A1* | 8/2004 | Lay et al. | 358/1.15 |
| 2005/0163516 | A1* | 7/2005 | Eom | 399/12 |
| 2005/0168777 | A1* | 8/2005 | Nishikawa et al. | 358/1.15 |
| 2005/0210129 | A1* | 9/2005 | Feng et al. | 709/224 |
| 2005/0254834 | A1* | 11/2005 | Shibui | 399/12 |
| 2006/0050289 | A1* | 3/2006 | Abe et al. | 358/1.9 |
| 2007/0002355 | A1* | 1/2007 | Kai | 358/1.13 |
| 2008/0071605 | A1* | 3/2008 | Asauchi et al. | 705/10 |

FOREIGN PATENT DOCUMENTS

| CN | 1343928 | 4/2002 |
|---|---|---|
| JP | 2001-117743 | 4/2001 |
| JP | 2001117743 | 4/2001 |
| JP | 2001-142600 A | 5/2001 |
| JP | 2004-178175 A | 6/2004 |
| KR | 200117874 | 5/2001 |

OTHER PUBLICATIONS

Japanese Office Action dated Mar. 12, 2010, concerning JP Application No. 2005-193087.
Office Action, dated Sep. 20, 2007, in corresponding Korean application.

* cited by examiner

*Primary Examiner* — Benny Q Tieu
*Assistant Examiner* — Marcellus Augustin
(74) *Attorney, Agent, or Firm* — Fitzpatrick, Cella, Harper & Scinto

(57) ABSTRACT

To overcome the conventional drawbacks, the present invention comprises the an information processing apparatus which is connected to a printing apparatus that holds unique information functions as message saving means for saving message information in association with each language selectable as a language for use, component ID information saving means for saving component ID information in association with each value of unique information held by the printing apparatus, language selection means for selecting a language for use, acquisition means for acquiring unique information held by the printing apparatus from the printing apparatus, and message creation means for creating a message to be output on the basis of message information associated with a language selected by the language selection means and component ID information associated with a value of the unique information acquired by the acquisition means.

6 Claims, 20 Drawing Sheets

F I G. 3
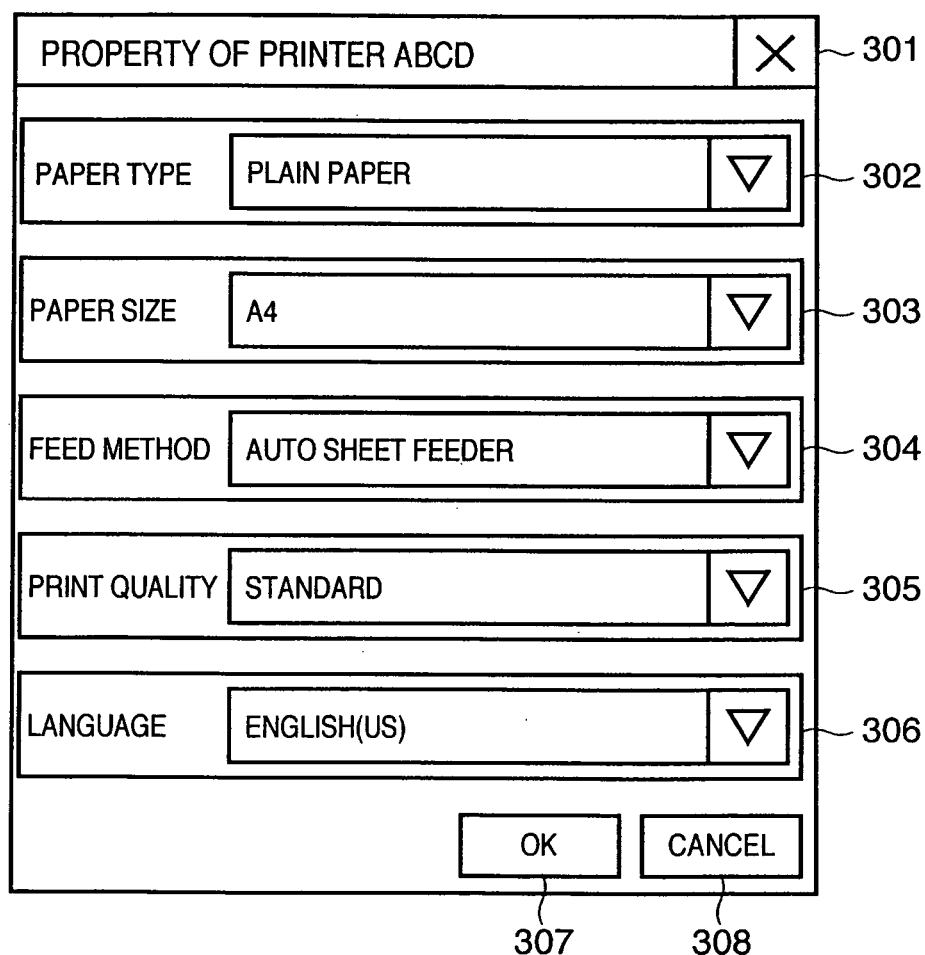

FIG. 7

| S | U | P | : | R | E | G | 1 | : |

| LANGUAGE | RESOURCE DATABASE FILE | RECORDING MATERIAL INFORMATION HELP FILE |
|---|---|---|
| JAPANESE | RES_JP.DLL | INK_HELP_JP.HLP |
| ENGLISH (US) | RES_US.DLL | INK_HELP_US.HLP |
| ENGLISH (UK) | RES_UK.DLL | INK_HELP_UK.HLP |
| FRENCH | RES_FR.DLL | INK_HELP_FR.HLP |
| GERMAN | RES_DE.DLL | INK_HELP_DE.HLP |
| CHINESE | RES_CN.DLL | INK_HELP_CN.HLP |

FIG. 10

| E | R | R | : | I | N | K | ; | I | N | K | O | U | T | : | Y |
|---|---|---|---|---|---|---|---|---|---|---|---|---|---|---|---|
| ; | I | N | K | O | U | T | : | K | ; | | | | | | |

FIG. 11

| COMPATIBLE RECORDING MATERIAL INFORMATION | MESSAGE ID OF RECORDING MATERIAL CHARACTER STRING |
|---|---|
| REG 1 | 11101 (CYAN) |
| | 11102 (MAGENTA) |
| | 11103 (YELLOW) |
| | 11104 (BLACK) |
| REG 2 | 11201 (CYAN) |
| | 11202 (MAGENTA) |
| | 11203 (YELLOW) |
| | 11204 (BLACK) |
| REG 3 | 11301 (CYAN) |
| | 11302 (MAGENTA) |
| | 11303 (YELLOW) |
| | 11304 (BLACK) |

| STATUS INFORMATION | MESSAGE ID |
|---|---|
| ERR : 000 | 0000 |
| ERR : INK | 0001 |
| INKOUT : C | 1001 |
| INKOUT : M | 1002 |
| INKOUT : Y | 1003 |
| INKOUT : K | 1004 |

| MESSAGE ID | MESSAGE CHARACTER STRING |
|---|---|
| 0000 | "エラーは発生していません。" |
| 0001 | "下記のインクがなくなりました。[LF]" |
| 1001 | "シアン[LF]" |
| 1002 | "マゼンタ[LF]" |
| 1003 | "イエロー[LF]" |
| 1004 | "ブラック[LF]" |
| 11101 | "INK_001_C" |
| 11102 | "INK_001_M" |
| 11103 | "INK_001_Y" |
| 11104 | "INK_001_Bk" |
| 11201 | "INK_002_C" |
| 11202 | "INK_002_M" |
| 11203 | INK_002_Y" |
| 11204 | "INK_002_Bk" |
| 11301 | "INK_003_C" |
| 11302 | "INK_003_M" |
| 11303 | INK_003_Y" |
| 11304 | "INK_003_Bk" |

| MESSAGE ID | MESSAGE CHARACTER STRING |
| --- | --- |
| 0000 | "On-line" |
| 0001 | "The following ink tanks have run out. [ LF ]" |
| 1001 | "Cyan [ LF ]" |
| 1002 | "Magenta [ LF ]" |
| 1003 | "Yellow [ LF ]" |
| 1004 | "Black [ LF ]" |
| 11101 | "INK_001_C" |
| 11102 | "INK_001_M" |
| 11103 | "INK_001_Y" |
| 11104 | "INK_001_Bk" |
| 11201 | "INK_002_C" |
| 11202 | "INK_002_M" |
| 11203 | INK_002_Y" |
| 11204 | "INK_002_Bk" |
| 11301 | "INK_003_C" |
| 11302 | "INK_003_M" |
| 11303 | INK_003_Y" |
| 11304 | "INK_003_Bk" |

F I G. 16
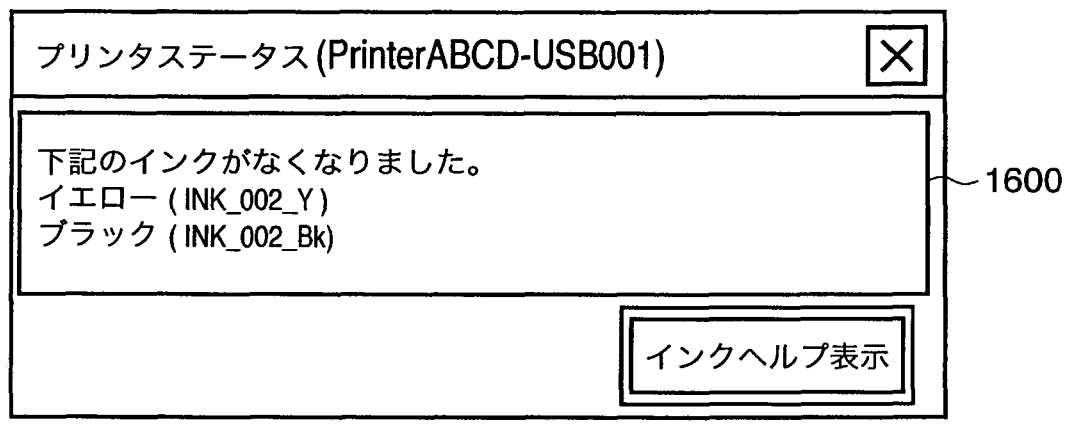

FIG. 18

| STATUS INFORMATION | MESSAGE CHARACTER STRING | |
|---|---|---|
| ERR:0000 | "NO ERROR OCCURS." | ⎫ |
| ERR:INK | "THE FOLLOWING INK TANKS HAVE RUN OUT. [LINE FEED]" | |
| INKOUT:C | "CYAN [LINE FEED]" | ⎬ 1801 |
| INKOUT:M | "MAGENTA [LINE FEED]" | |
| INKOUT:Y | "YELLOW [LINE FEED]" | |
| INKOUT:K | "BLACK [LINE FEED]" | ⎭ |
| REG 1 | "INK_001_C" | ⎫ |
|  | "INK_001_M" | |
|  | "INK_001_Y" | |
|  | "INK_001_Bk" | |
| REG 2 | "INK_002_C" | |
|  | "INK_002_M" | ⎬ 1802 |
|  | INK_002_Y" | |
|  | "INK_002_Bk" | |
| REG 3 | "INK_003_C" | |
|  | "INK_003_M" | |
|  | INK_003_Y" | |
|  | "INK_003_Bk" | ⎭ |

INFORMATION PROCESSING APPARATUS AND PRINTING CONTROL APPARATUS STORING RECORDING MATERIAL INFORMATION CORRESPONDING TO A SHIPPING DESTINATION OF THE PRINTER FOR RESPECTIVE SHIPPING DESTINATION AREAS

FIELD OF THE INVENTION

The present invention relates to an information processing apparatus and printing control apparatus capable of properly outputting information on one product that is described in different ways depending on a designated language, the area where the product is used, or the like and, more particularly, to an information processing apparatus and printing control apparatus capable of properly displaying model number information of a component available in a printing apparatus in accordance with a designated language and the area where the printing apparatus is used.

BACKGROUND OF THE INVENTION

Conventional consumer printers often use an ink cartridge or toner cartridge which is encapsulated in advance in an easy-to-use cartridge. To allow the user to select a proper cartridge from many ink cartridges and toner cartridges, there is proposed a printer driver capable of displaying a help window which describes the model number of an ink cartridge or toner cartridge which matches (is compatible with) a printer. Another printer driver is devised to, when displaying a message warning that the remaining amount of ink or toner is running short, specify, in the message, the model number of an ink cartridge or toner cartridge compatible with a printer, and prompt the user to purchase a correct cartridge.

Recently, there is proposed a printer driver capable of switching between various languages. This printer driver can switch its language to a language used in the shipping destination area of the printer. Printer drivers of one type can be shipped to various areas, increasing the development and production efficiencies. It is another advantage that the user can use the printer driver in a familiar language by only switching the language setting regardless of the area where the printer is used. As a method which implements this printer driver, for example, the user is prompted to select one of languages as a printer driver language, and a message of the printer driver is displayed in the selected language (see, e.g., patent reference 1). According to this method, a library file which stores message character strings is prepared for each language serving as a choice. When the printer driver displays a message, a message character string is acquired from a library file corresponding to the selected language, and displayed.

[Patent Reference 1] Japanese Patent Laid-Open No. 2001-142600

However, the above-described prior art suffers the following problems. When the model number of an ink cartridge or toner cartridge is displayed in the message or help window of the printer driver, the displayed model number is permanently held by the printer driver. Even if the language setting of the printer driver can be switched, the held cartridge model number is fixed. When the cartridge model number compatible with a given printer changes depending on the shipping destination of the product, a printer driver which holds a compatible cartridge model number must be created for each shipping destination. This impairs the advantage of the printer driver configured to be able to select the language, decreasing the development and production efficiencies of the printer driver.

SUMMARY OF THE INVENTION

The present invention has been made to overcome the conventional drawbacks, and has as its object to provide an information processing apparatus, printing control apparatus, and program capable of properly outputting information on one product that is described in different ways depending on a language used, the area where the product is used, or the like. It is another object of the present invention to provide an information processing apparatus, printing control apparatus, and program capable of properly displaying model number information of a component compatible with a printing apparatus in accordance with a designated language and the area where the printing apparatus is used. It is still another object of the present invention to provide an information processing apparatus, status display method, and program capable of accurately displaying the model numbers of consumables supported by a connected printing apparatus independently of a set language.

To achieve the above objects, the present invention comprises the following configuration. That is, according to one aspect of the present invention, an information processing apparatus which is connected to a printing apparatus that holds unique information functions as message saving means for saving message information in association with each language selectable as a language for use, component ID information saving means for saving component ID information in association with each value of unique information held by the printing apparatus, language selection means for selecting a language for use, acquisition means for acquiring unique information held by the printing apparatus from the printing apparatus, and message creation means for creating a message to be output on the basis of message information associated with a language selected by the language selection means and component ID information associated with a value of the unique information acquired by the acquisition means.

The unique information corresponds to compatible recording material information. The message saving means for saving message information in association with each language selectable as a language for use corresponds to a resource database for each language. The component ID information associated with each value of unique information held by the printing apparatus corresponds to the message ID of a recording material character string. The component ID information saving means for saving the component ID information corresponds to a status display processing unit 120. The language selection means for selecting a language for use corresponds to a language selection UI 117a. The acquisition means for acquiring unique information held by the printing apparatus from the printing apparatus corresponds to a data communication processing unit 119. The message creation means for creating a message to be output on the basis of message information associated with a language selected by the language selection means and component ID information associated with a value of the unique information acquired by the acquisition means corresponds to the status display processing unit 120.

According to another aspect of the present invention, there is provided a printing control apparatus which
  acquires device information from a peripheral device in accordance with a notification of status information from the peripheral device, converts the device information into readable device information corresponding to a computer-designated language, determines a readable message that corresponds to the status information and complies with the computer-designated language, and composites the readable device information and the readable message to create an output message.

According to the present invention, information on one product that is described in different ways depending on a language used or the area where the product is used can be properly output. Particularly, model number information of a component compatible with a printing apparatus can be appropriately displayed in accordance with a designated language and the area where the printing apparatus is used. Therefore, a proper display can be provided by a single printer driver for printers of one type regardless of the difference in language and the model number of a component, increasing the development and production efficiencies of the printer driver. In addition, the model numbers of consumables supported by a connected printing apparatus can be accurately displayed irrespective of a set language.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing an example of a print setting dialog displayed on the information notification unit of the data processing apparatus shown in FIG. 1;

FIG. 7 is a schematic view showing the data format of compatible recording material information contained in a device ID of which a printer 101 shown in FIG. 1 notifies a PC 102;

FIG. 10 is a schematic view showing the data format of status information of which the printer 101 shown in FIG. 1 notifies the PC 102;

FIG. 11 is a table showing an example of a recording material ID table representing the correspondence between compatible recording material information and message IDs;

FIG. 12 is a table showing an example of a status ID table representing the correspondence between status information and message IDs;

FIG. 13A is a table showing an example of a message character string table representing the correspondence between message IDs and character strings in Japanese;

FIG. 13B is a table showing an example of a message character string table representing the correspondence between message IDs and character strings in English;

FIG. 16 is a view showing still another display example (when printing cannot continue) of the status display window of the printer driver 203 shown in FIG. 1;

FIG. 18 is a table showing an example of a table used in a modification to the embodiment.

DETAILED DESCRIPTION OF THE PREFERRED EMBODIMENTS

Preferred embodiments of the present invention will be described in detail below with reference to FIGS. 1 to 17. In the embodiments, a USB stands for a universal serial bus which is a well-known interface capable of bi-directional communication, and a detailed description thereof will be omitted.

<Configuration of Printing System>

Figure 1:
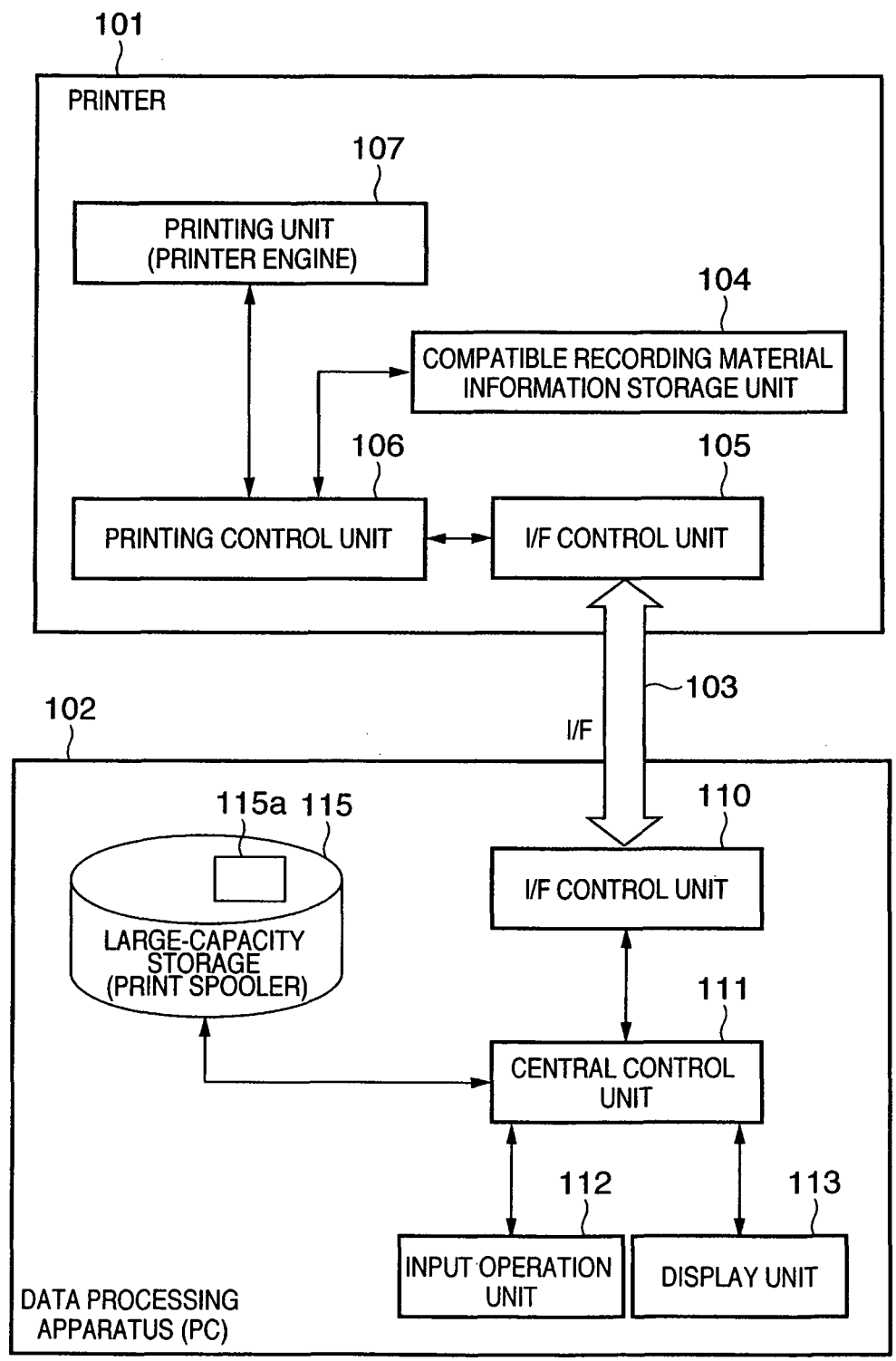
FIG. 1 is a block diagram showing the configuration of a printing system to which a data processing apparatus according to an embodiment of the present invention can be applied.

FIG. 1 is a block diagram showing the configuration of a printing system to which a data processing apparatus (information processing apparatus) according to an embodiment of the present invention can be applied. In FIG. 1, a printer 101 is an inkjet color printer which forms an image. The printer 101 forms an image on the basis of print data generated by a data processing apparatus such as a personal computer (PC) 102 to be described later. The embodiment will exemplify the inkjet color printer, but the type of printer is arbitrary. The printer 101 is comprised of various functional blocks 104 to 107.

The compatible recording material information storage unit 104 is a nonvolatile storage device for storing information on a recording material (e.g., a toner cartridge or ink cartridge) compatible with the printer 101. Although the compatible recording material information storage unit 104 is not limited to recording materials and can also be applied to other consumables, the embodiment will describe only recording materials as consumables. The compatible recording material information storage unit 104 is implemented by, e.g., a ROM. In the embodiment, information on consumables compatible with the printer 101 contains information for specifying recording materials determined for each shipping destination of the printer 101. That is, the compatible recording material information storage unit 104 stores information unique to each shipping destination area which is a unit of areas where the model numbers of consumables are common. For example, assume that the ink cartridge of the printer 101 is represented by a common model number in areas A and B. In this case, the compatible recording material information storage unit 104 of a printer 101 whose shipping destination is area A and that of a printer 101 whose shipping destination is area B store the same compatible recording material information (i.e., information unique to the shipping destination). This is irrespective of the relevance in geography and language between areas A and B.

Figure 7:
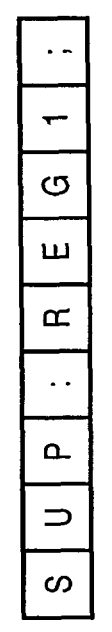

FIG. 7 shows an example of compatible recording material information. In the embodiment, the compatible recording material information storage unit 104 stores character string information "REG1", "REG2", or "REG3" as represented by an example of "compatible recording material information" in FIG. 7. The character string "SUP:" is an identifier representing that a subsequent character string is compatible recording material information (FIG. 7 shows only "REG1"). The compatible recording material information may be binary information. The compatible recording material information is recorded in advance in the compatible recording material information storage unit 104 in a factory or the like before shipping of the printer in accordance with the shipping destination of the printer 101.

The I/F control unit 105 interfaces the printer 101. In the embodiment, the interface with the personal computer 102 is a USB, and the I/F control unit 105 is formed from the controller of the USB on the peripheral device side. The I/F control unit 105 transmits compatible recording material information, and receives print data and control commands. Further, the I/F control unit 105 transmits, to the PC 102, status information such as a communication state and an error generated in the printer 101.

The printing control unit 106 receives print data transmitted from the PC 102, and controls image formation by the printer engine 107. Print data transmitted from the PC 102 is data having undergone image processing by the PC 102 on the basis of print settings containing the type and size of paper and the like. The printing control unit 106 controls the printer engine 107 in accordance with a printing control command contained in print data. More specifically, print data is made up of binary print data (in some cases, intermediate data before binarization), and various commands for controlling the ink discharge amount, the number of passes, the print direction, and the paper convey amount. The printing control unit 106 causes the printer engine 107 to form an image corresponding to binary data while controlling the ink discharge amount, the number of passes, the print direction, and the paper convey amount on the basis of print data containing these pieces of information.

The printing unit (printer engine) 107 prints on a recording medium (paper) under the control of the printing control unit 106. Since the printer 101 is an inkjet printer, the printer engine 107 forms an image by discharging ink. The printer engine 107 comprises a feed means such as an auto sheet feeder, and prints on paper supplied by the feed means.

In FIG. 1, the data processing apparatus (PC) 102 generates print data and controls the connected printer 101. In the embodiment, the data processing apparatus 102 is a personal computer. The data processing apparatus 102 also plays a role of receiving an instruction and input associated with printing from the user. The PC 102 is made up of various functional blocks 110 to 115. Although not shown in FIG. 1, an operating system which controls the PC 102 is installed in the PC 102, and various functional blocks run on the operating system.

A communication interface 103 is an interface for connecting the PC 102 and printer 101. In the embodiment, a USB which is a serial interface is adopted as a communication interface. In addition, serial interfaces such as IEEE1394, Ethernet®, IrDA, IEEE802.11, and a power line, and parallel interfaces such as IEEE1284 and SCSI are available. In this manner, a plurality of types of interfaces are available, and any interface can be used regardless of a wired/wireless interface as far as the interface implements bi-directional communication. Note that functions of the printer 101 and PC 102 which are assumed not to be necessary to describe features of the embodiment will be omitted.

In the personal computer 102, the I/F control unit 110 interfaces the PC 102. The I/F control unit 110 is formed from the controller of the USB on the host side, and functions as the USB host. Some of functions of the USB host are also formed from software such as an OS and driver.

The large-capacity storage unit 115 is utilized as, e.g., a print spooler. The print spooler 115 sequentially stores print data generated by a print data generation processing unit 116 to be described later. The print spooler transfers stored print data to the printer 101. Print data is stored and transferred asynchronously. Thus, even when print data generation processing is performed more quickly than print processing by the printer 101, it is efficiently executed without waiting for print processing by the printer 101. In general, the print spooler is provided as a function of the operating system of a computer. The large-capacity storage unit 115 also saves print setting information 115a settable via a user interface provided by the printer driver. The print setting information contains, as setting items, the printing method, the type and size of paper, and a selected language.

The central control unit 111 controls various functions of the PC 102, and corresponds to a function of the CPU. The central control unit 111 has, e.g., a memory and CPU, and executes an operating system, printer driver, and application program. The printer driver is software for generating various settings for printing and print data in the PC 102, and controlling the printer from the PC 102. Details of the printer driver will be described with reference to FIGS. 2A and 2B.

The input operation unit 112 is formed from various input devices such as a keyboard and pointing device for reflecting the user's will in print settings and the like. The display unit 113 is connected to the personal computer 102, and displays the user interface window of the printer driver and the like. Display contents include status information and help information of the printer. As the notification method, notification by voice is also available in addition to display.

Note that the printing system in the embodiment is not a single apparatus, but is configured by connecting the PC 102 via a bi-directional interface to the printer 101 for forming an image. However, the present invention is not limited to this example, and may be applied to a printing system which is integrated with an apparatus by integrating a PC and printer function.

<Configuration of Printer Driver>

Figure 2A:
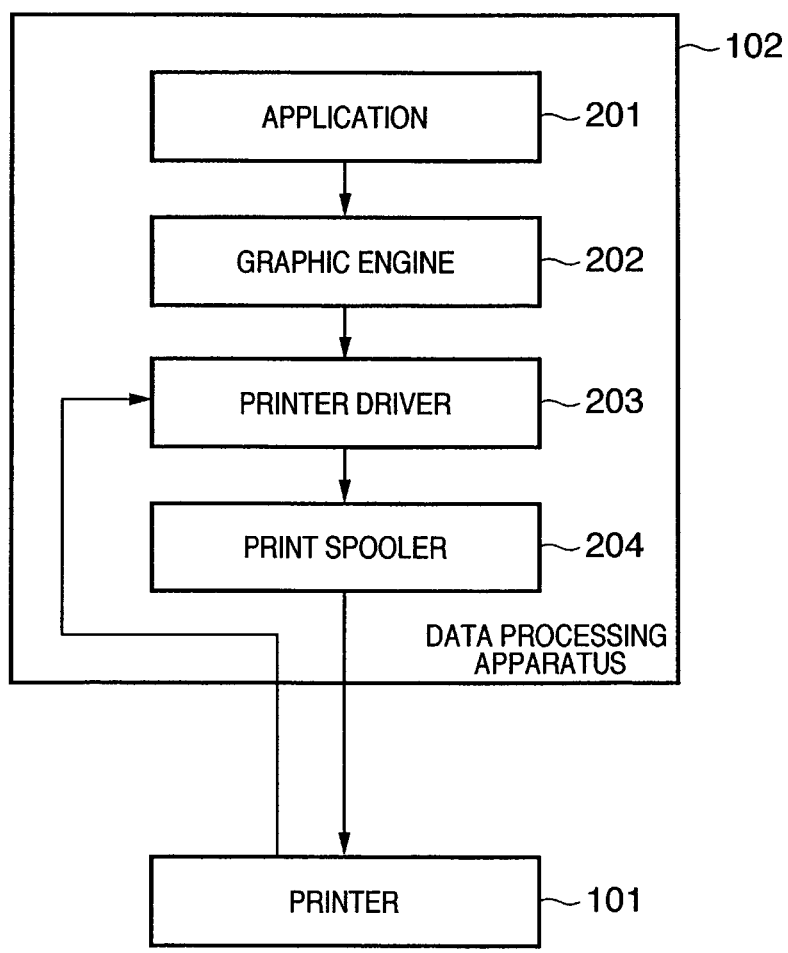
FIGS. 2A and 2B are block diagrams showing the software blocks of a personal computer shown in FIG. 1, and the internal configuration of a printer driver.
Figure 2B:
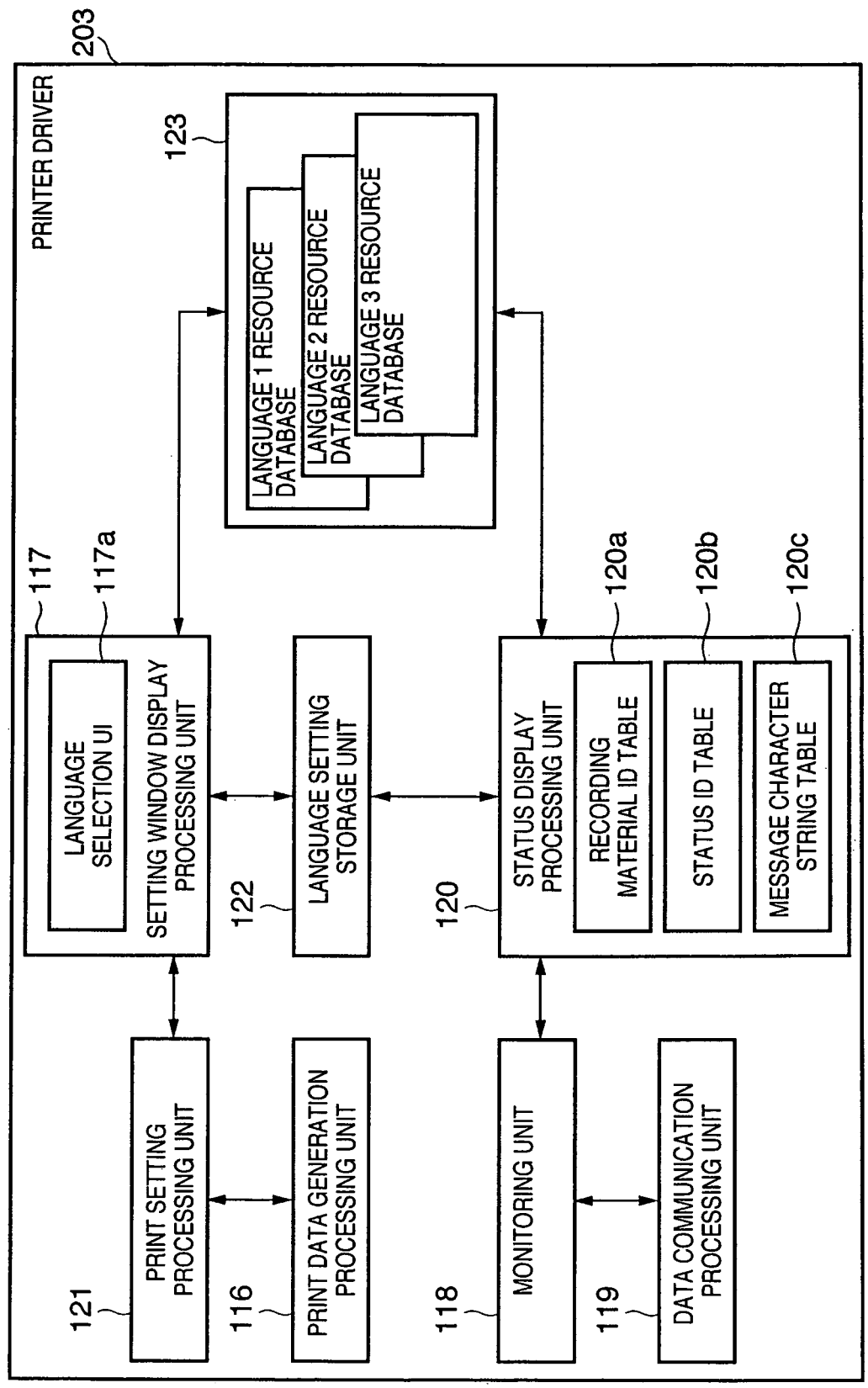

FIGS. 2A and 2B are block diagrams showing the functional blocks (FIG. 2A) of software in the PC 102, and the internal configuration (FIG. 2B) of a printer driver 203.

In FIG. 2A, an application 201, a graphic engine 202, the printer driver 203, and a print spooler 204 exist as files saved in an external memory such as a CD-ROM or hard disk. These files are program modules which are loaded in execution into the RAM of the central control unit 111 by an OS or modules which use these modules, and then executed. When print data is transmitted from the application 201 to the printer 101, print data is output (drawn) by using the graphic engine 202 which is loaded into the RAM and is executable. The graphic engine 202 loads the printer driver 203 prepared for each printing apparatus from an external memory into the RAM, and converts an output from the application 201 into a printer control command by using the printer driver 203. The converted printer control command passes through the print spooler 204 loaded into the RAM by the OS, and is output to the printer 101 via the interface 103. The printer driver 203 receives status information and compatible recording material information from the printer 101. The compatible recording material information received from the printer 101 is saved in, e.g., a monitoring unit 118. In other words, the monitoring unit 118 functions as a compatible recording material information saving means.

The printer driver 203 has a configuration shown in FIG. 2B. In FIG. 2B, a print setting processing unit 121 makes various print settings including a paper setting, print quality setting, and the like. The set contents are saved as the print setting information 115a. The print setting processing unit 121 has a function of accepting an instruction and input from the user, and displaying set contents or notifying the user of them.

The print data generation processing unit 116 creates a print job, generates print data in accordance with various settings made by the print setting processing unit 121, and spools the print data in the storage unit 115.

The monitoring unit 118 sequentially transfers print data stored in the storage unit 115 to the printer 101 via the I/F control unit 110 from a data communication processing unit 119 to be described later in accordance with an instruction from the storage unit 115. When print data is transferred to the printer 101 or a request is received from a status display processing unit 120 to be described later, the monitoring unit 118 acquires status information such as an error of the printer 101 or a warning by bi-directional communication with the printer 101. The status display processing unit 120 displays status information on the basis of the acquired information.

The data communication processing unit 119 communicates with the printer 101 via the I/F control unit 110 in accordance with an instruction from the monitoring unit 118. Communication processing with the printer 101 is bi-directional, and includes processing of transferring data such as print data to the printer 101, and processing of acquiring, from the printer 101, information such as a warning or an error generated in the printer, and printer status information such as remaining ink amount information.

The status display processing unit 120 displays an error message or the like on the basis of status information acquired by the monitoring unit 118 from the printer. The resource of character strings and the like to be displayed on the window is acquired from a language resource database 123 to be described later. The status display processing unit 120 has a recording material ID table 120a, a status ID table 120b and a message character string table 120c.

A setting window display processing unit 117 can display a window for making various settings associated with printing, and can accept a user input and make settings. The setting window display processing unit 117 also comprises a language selection user interface 117a for setting which of languages is used to display a character string in the setting window and status display window. The resource of character strings and the like to be displayed on the window of the language selection user interface is acquired from the language resource database 123 to be described later. It is also possible to refer to the system locale setting of the operating system and select a language in accordance with the contents of the setting without preparing any language selection user interface in the printer driver.

A language setting storage unit 122 stores the setting contents of the language display/selection unit of the above-described setting window display processing unit 117. In displaying a window, the setting window display processing unit 117 and status display processing unit 120 refer to the language setting storage unit 122, and refer to a selected language resource database in accordance with the recorded contents.

In the embodiment, the language resource database 123 is a set of DLL files (resource database files) which hold resource information of languages.

<Example of Print Setting Dialog>

FIG. 3 is a view showing an example of a print setting dialog displayed on the display unit 113 of the data processing apparatus 102 shown in FIG. 1. FIG. 3 shows an example of a print setting dialog box displayed to change print setting information such as a print mode and various paper settings in the embodiment. In FIG. 3, a print setting dialog box 301 is displayed before the user performs a print operation with application software or the like. The dialog box 301 displays currently saved print setting information. The user can make various settings associated with generation of print data (e.g., the paper type, paper size, feed method, and print quality) via the dialog box 301. Note that the dialog box 301 is displayed on the display unit 113 shown in FIG. 1.

In FIG. 3, the print setting dialog box 301 is made up of display areas 302 to 306 and buttons 307 and 308. The display area 302 is a paper type selection area for displaying and selecting a set paper type. In the paper type selection area 302, for example, plain paper, coated paper, glossy paper, postcard, and envelope are prepared as choices of the paper type. Print data corresponding to a paper type selected in the paper type selection area 302 is generated.

The display area 303 is a paper size selection area for displaying and operating a set paper size. In the paper size selection area 303, for example, B5, A4, Letter, postcard, business card, L, and 2L are prepared as choices of the paper size. Print data is generated on the basis of a paper width and length corresponding to a paper size selected in the paper size selection area 303. Note that when a print operation is done from some applications, print data may be generated on the basis of a paper size (paper width and length) set in the applications, instead of a paper size set in the paper size selection area 303.

The display area 304 is a feed method selection area for displaying and selecting the type of a feed means of the printer 101 that is used in printing. In the feed method selection area 304, for example, an auto sheet feeder, cassette 1, and cassette 2 are prepared as choices of the feed method. The auto sheet feeder, cassette 1, and cassette 2 correspond to an auto sheet feeder, cassette 1, and cassette 2 serving as feed means of the printer 101, respectively. When one of these choices is selected to perform a print operation, paper is fed from the selected feed means to print.

The display area 305 is a print quality selection area for displaying and selecting the print quality. The setting of the print quality changes for each paper type. As choices of the print quality, for example, "fine", "standard", and "quick" are prepared, and the user can select a desired one of them.

The display area 306 is a language selection area for displaying and selecting the languages of the setting window and status display window of the printer driver. As choices of the language, for example, Japanese, English (US), English (UK), French, German, and Chinese are prepared, and the user can select one of them.

When the user clicks the OK button 307, print setting information selected in the print setting dialog box 301 is saved, and then the print setting dialog box 301 is closed. When the cancel button 308 is clicked, print settings selected in the print setting dialog box 301 are restored to those before the change, and then the print setting dialog box 301 is closed.

Although not described here, an update button for saving print setting information while keeping the dialog box open may be added. In this manner, the print setting dialog 301 has a window layout having a set of print setting information items which can be changed by the user. This layout allows the user to confirm print settings at a glance. Note that the character strings of the display example, display item names, and choices in FIG. 3 correspond to a case wherein the language setting is English. When another language is selected, these character strings are displayed in the selected language.

<Data Held by Printer Driver>

FIG. 7 is a schematic view showing the data format of compatible recording material information contained in the device ID of the printer 101. In FIG. 7, each frame represents 1-byte data. The first four bytes ("SUP:") indicate a data name representing that subsequent information is compatible recording material information. Four subsequent bytes ("REG1") indicate a character string representing compatible recording material information. One subsequent byte (";") indicates the terminal symbol of the data. The embodiment assumes three types of compatible recording material information: "REG1", "REG2", and "REG3".

Figure 8:
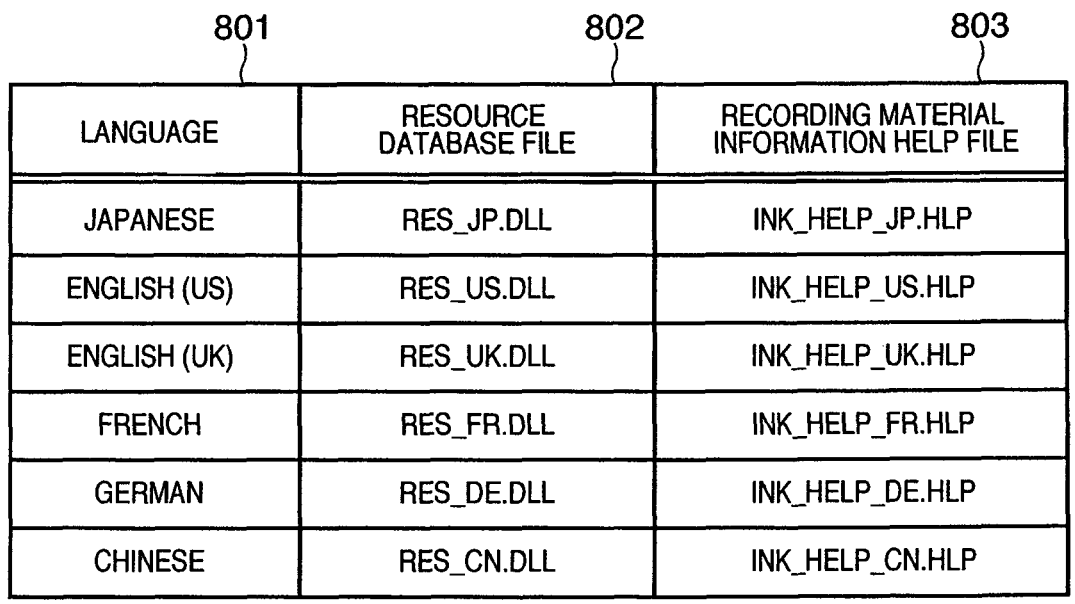
FIG. 8 is a table showing the correspondence table between the language, resource database file, and help file which are held by a printer driver 203 shown in FIG. 1.

FIG. 8 is a table showing the data format of information (to be referred to as language-file correspondence information hereinafter) representing the correspondence between a language type 801 displayed or selected in the language selection area 306, and the file name of each language. The file name corresponding to each language type includes a resource database file name 802 of the language and a file name 803 of a recording material information help file in each language. The language-file correspondence information is stored in advance in the setting window display processing unit 117 and status display processing unit 120. Needless to say, the language-file correspondence information may also be shared between the two processing units. In activation, the setting window display processing unit 117 and status display processing unit 120 acquire a language setting by referring to the language setting storage unit 122, and check the result against the correspondence table in FIG. 8 to determine a subsequent resource database file to be accessed. In activation, the status display processing unit 120 refers to the language setting storage unit 122, and checks the result against the correspondence table in FIG. 8 to determine a subsequent recording material information help file to be accessed.

Figure 9:
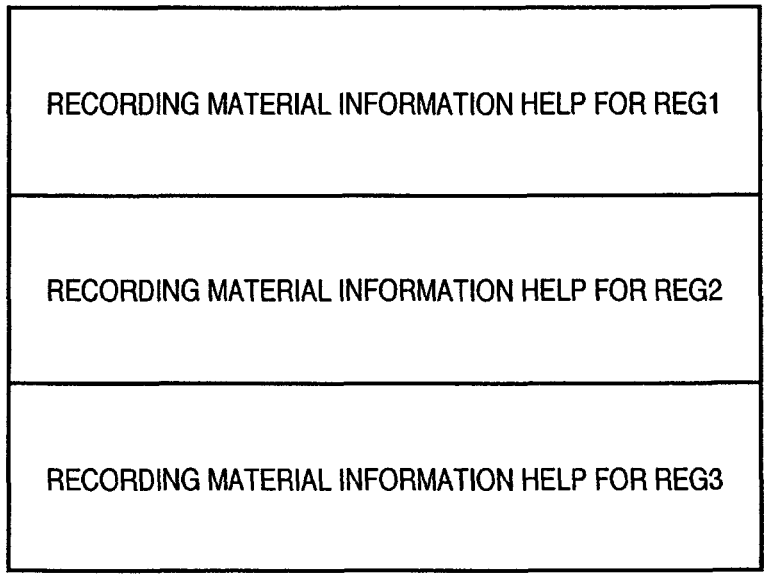
FIG. 9 is a schematic view showing the structure of a recording material information help file held by the printer driver 203 shown in FIG. 1.

FIG. 9 is a schematic view showing the structure of the recording material information help file in the embodiment. A help file is arranged as an individual file for each language, and the recording material information help file in each language records pieces of recording material information corresponding to all possible pieces of compatible recording material information (REG1, REG2, and REG3 in the embodiment) of the printer. When a help file is to be opened, compatible recording material information is designated and opened to display a help window containing the model number and image of a recording material corresponding to the designated compatible recording material information. For example, a help file when Japanese is selected is "INK_HELP_JP.HLP" from the language-file correspondence table in FIG. 8. INK_HELP_JP.HLP is made up of a recording material information help file for REG1, a recording material information help file for REG2, and a recording material information help file for REG3, as shown in FIG. 9. Thus, a recording material information help file having a composited name (e.g., REG1_INK_HELP_JP.HLP) of the language-file correspondence table in FIG. 8 and compatible recording material information. If a help file name obtained from the language is INK_HELP_JP.HLP and the compatible recording material information is REG1, a help file of a name "REG1_INK_HELP_JP.HLP is used to display a help window. This is merely an example of the method of specifying a file. A recording material information help file is also saved as part of the language resource database in association with each language.

Figure 10:
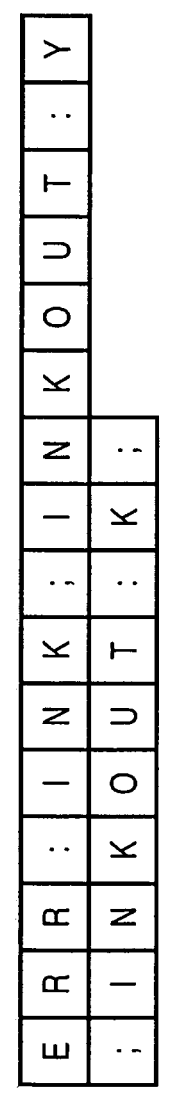

FIG. 10 is a schematic view showing the data format of an example of status information of which the printer 101 notifies the PC 102. In FIG. 10, each frame represents 1-byte data. The first four bytes ("ERR:") indicate a name of data representing error information. Three subsequent bytes ("INK") indicate an error code representing an ink runout error. One subsequent byte (";") indicates the terminal symbol of the data. In the embodiment, error codes are "INK" (ink runout error) and "000" (no error). Seven subsequent bytes ("INKOUT:") indicate a name of data representing the type of ink suffering an ink runout error. One subsequent byte ("Y") indicates a parameter character representing that yellow ink has run out. One subsequent byte (";") indicates the terminal symbol of the data. Similarly, seven subsequent bytes ("INKOUT:") indicate a name of data representing the type of ink suffering an ink runout error. One subsequent byte ("K") indicates a parameter character representing that black ink has run out. One subsequent byte (";") indicates the terminal symbol of the data. "INKOUT:" can take parameter characters "C" (runout of cyan ink) and "M" (runout of magenta ink). The example in FIG. 10 represents that yellow and black ink runout errors occur.

FIG. 11 is a table showing the data format of information (to be referred to as a recording material ID table 120a) representing the correspondence between compatible recording material information (shown in FIG. 7) contained in the device ID of the printer 101, and the message ID of a recording material model number character string. The recording material ID table is a table of message IDs corresponding to pieces of compatible recording material information (to be also referred to as message IDs associated with recording material information). For descriptive convenience, a color corresponding to a message ID is added in parentheses in FIG. 11. Characters in parentheses may not be contained in the recording material ID table 120a. The recording material ID table 120a is stored in advance in the status display processing unit 120. In activation, the status display processing unit 120 acquires compatible recording material information, and checks the result against the recording material ID table 120a shown in FIG. 11 to acquire the message ID of a recording material model number character string. For example, when compatible recording material information is "REG1", the message ID of a corresponding recording material model number character string is 11101 for cyan, 11102 for magenta, 11103 for yellow, and 11104 for black, and these message IDs are obtained. On the basis of the message ID, the status display processing unit 120 can acquire a recording material model number character string from correspondence tables shown in FIGS. 13A and 13B to be described later.

FIG. 12 is the status ID table 120b showing the correspondence between status information of the printer 101 and the message ID of a status character string displayed by the status display processing unit 120. The status ID table 120b is a table of message IDs corresponding to pieces of status information (to be also referred to as message IDs associated with status information). In this example, "0000" is designated as a message ID when the error code following "ERR:" is "000". Also, "0001" is designated as a message ID when the error code following "ERR:" is "INK". In addition, "1001", "1002", "1003", and "1004" are designated as message IDs when the parameter characters following "INKOUT:" are "C", "M", "Y", and "K", respectively. The status ID table 120*b* is also held by the status display processing unit 120.

FIGS. 13A and 13B are tables each showing an example of the correspondence table (to be referred to as a message character string table 120*c*) between message IDs shown in FIGS. 11 and 12, and actual message character strings displayed by the status information processing unit. A message character string table is also prepared for each language serving as a choice. FIG. 13A shows an example in Japanese, and FIG. 13B shows an example in English (US). The message ID includes a message ID (FIG. 11) associated with compatible recording material information, and a message ID (FIG. 12) corresponding to status information. For both the message IDs, the message character string table defines corresponding character strings. A character string corresponding to a message ID associated with status information is a character string which describes status information in a language. A character string corresponding to a message ID associated with compatible recording material information is a character string which represents information for specifying a recording material, e.g., a model number. For example, when Japanese is selected, a character string corresponding to a message ID "0000" representing status information is 「エラーは発生していません。」, and a character string corresponding to a message ID "11204" representing compatible recording material information is "INK__002_Bk". The message character string table is contained in a resource database file corresponding to a selected language.

<Example of Status Display>

Figure 5:
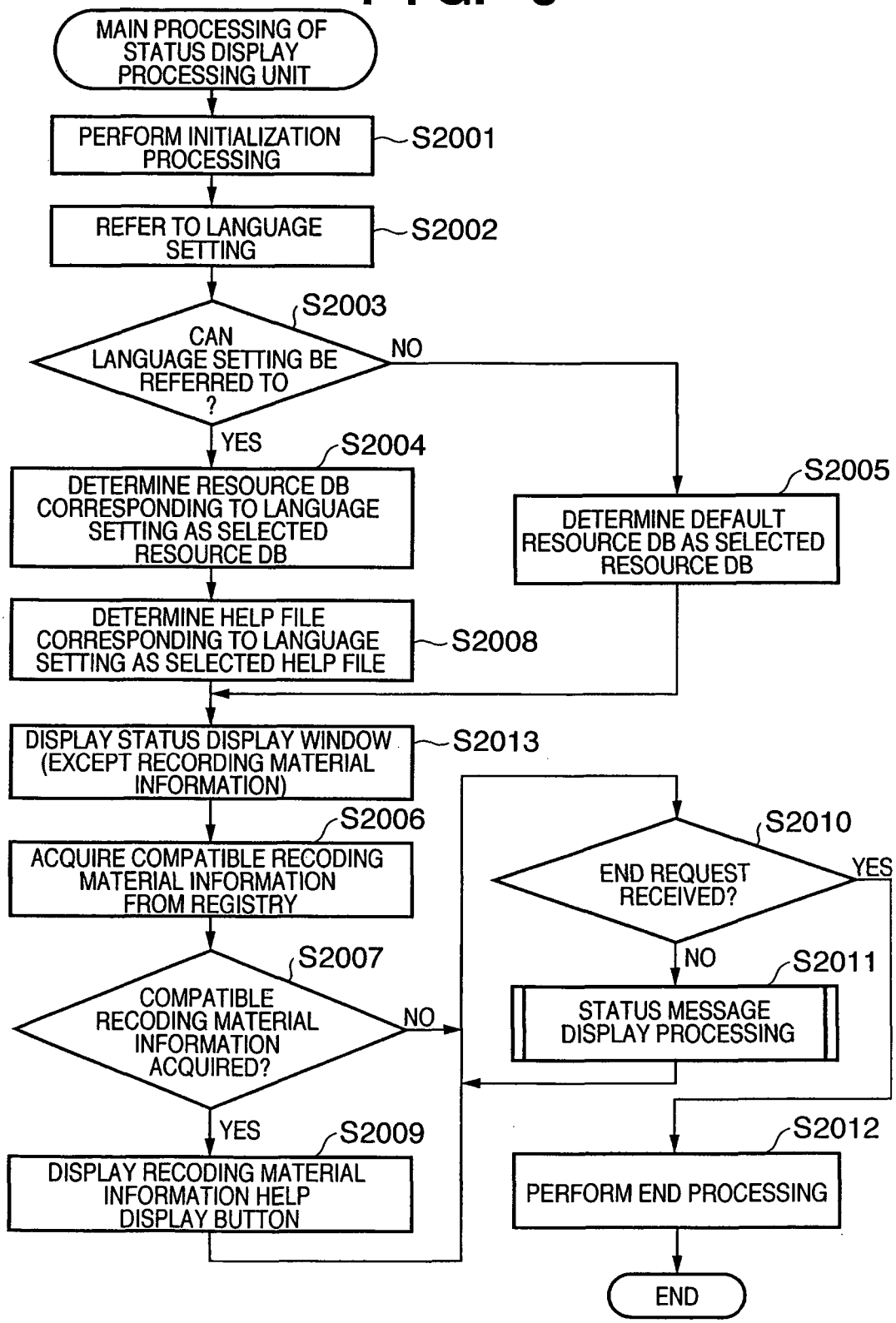
FIG. 5 is a flowchart showing the processing operation of status display processing by the status display processing unit of the printer driver shown in FIG. 2B.
Figure 6:
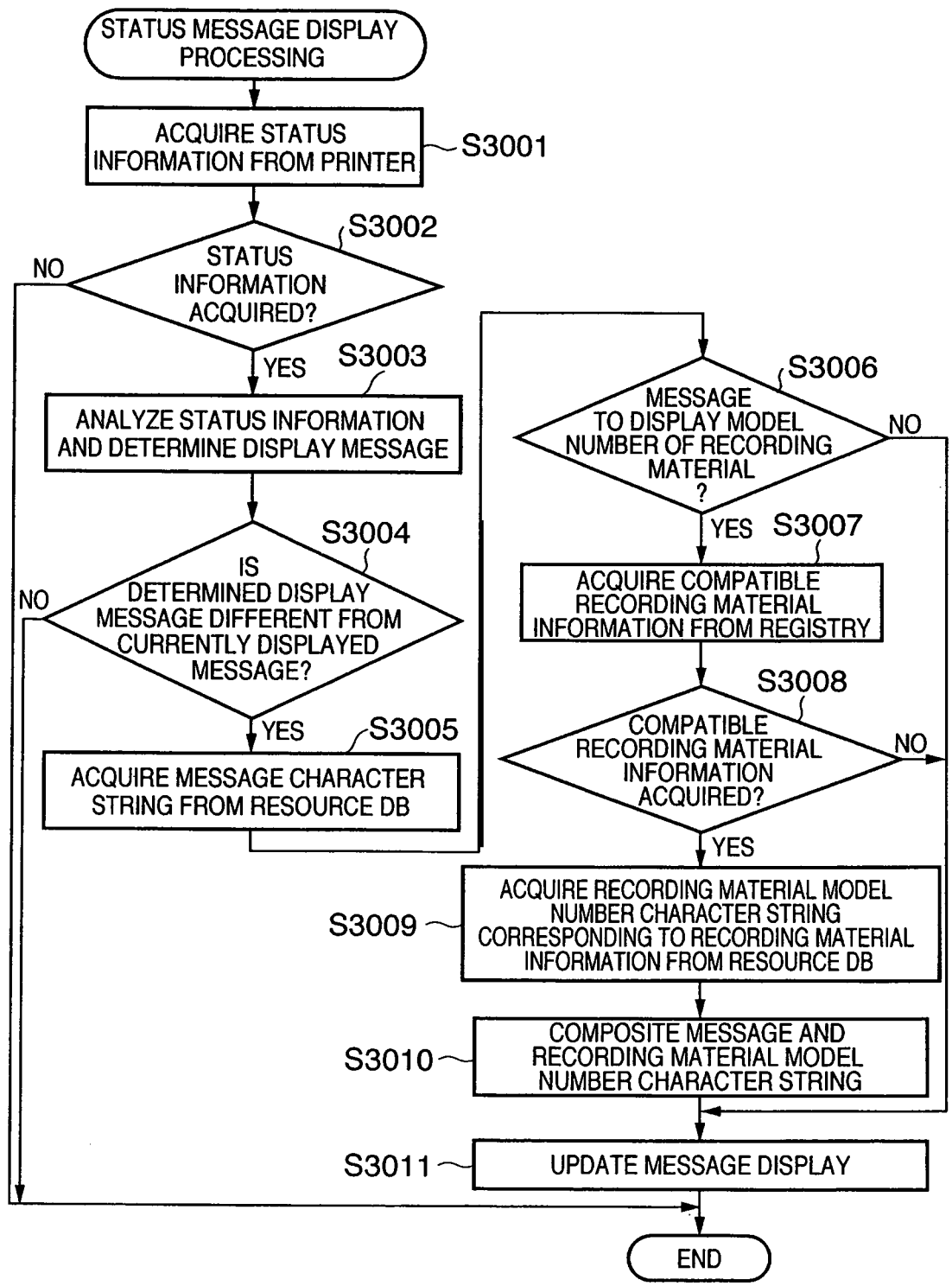
FIG. 6 is a flowchart showing the processing operation of status display processing by the status display processing unit of the printer driver shown in FIG. 2B.
Figure 14:
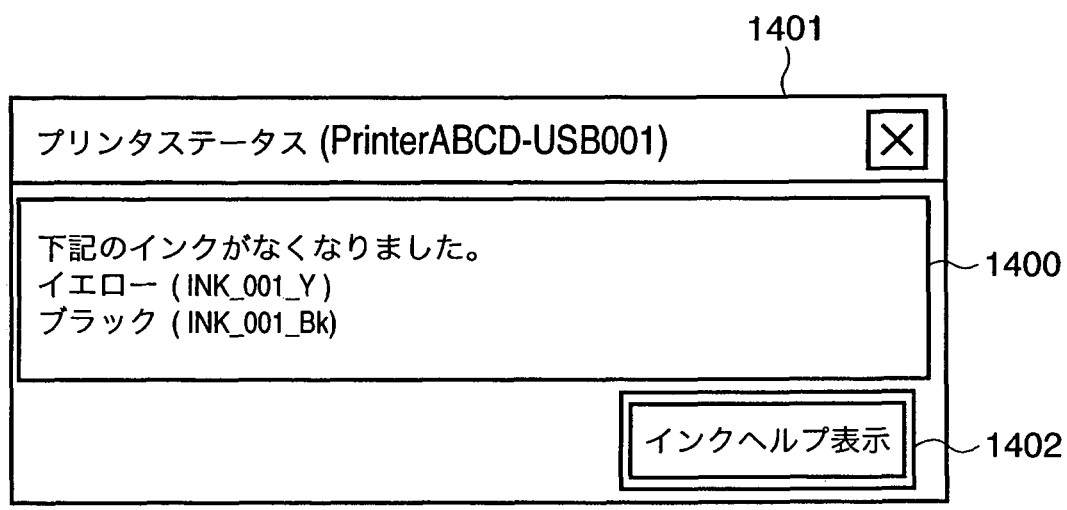
FIG. 14 is a view showing a display example (when printing cannot continue) of the status display window of the printer driver 203 shown in FIG. 1.
Figure 15:
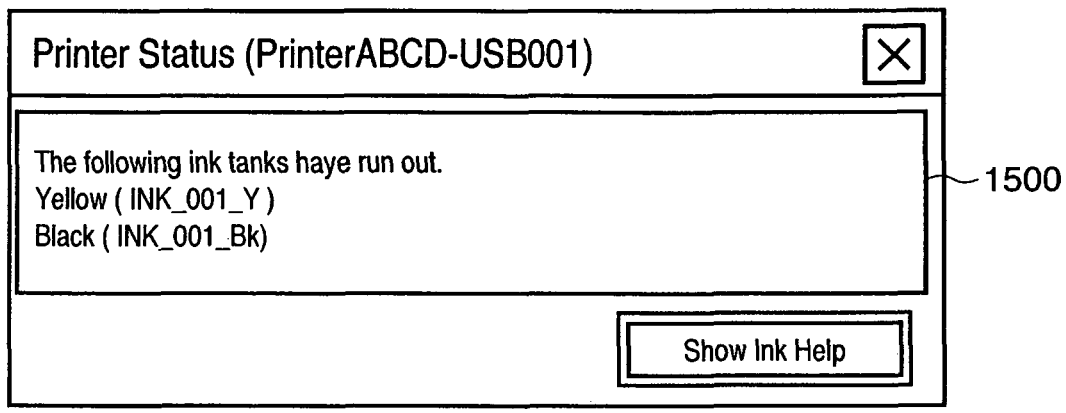
FIG. 15 is a view showing another display example (when printing cannot continue) of the status display window of the printer driver 203 shown in FIG. 1.
Figure 17:
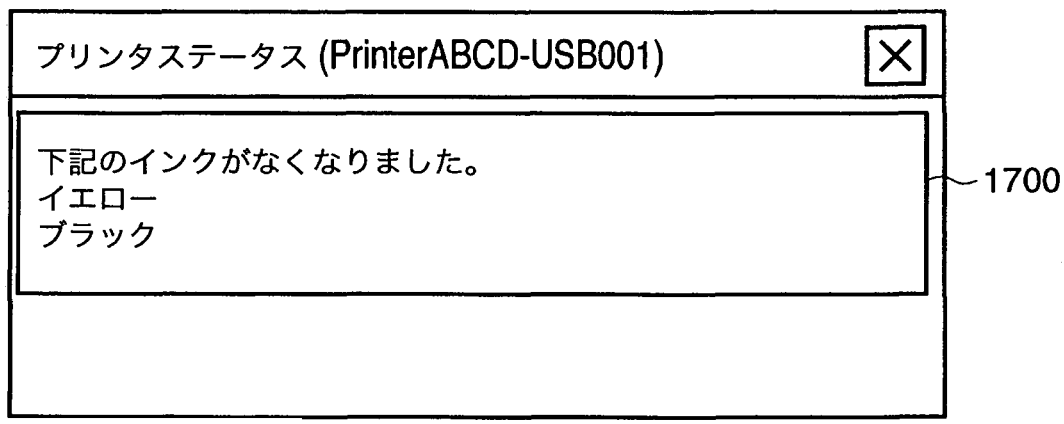
FIG. 17 is a view showing still another display example of the status display window of the printer driver 203 shown in FIG. 1.

FIGS. 14 to 17 show examples of status display windows displayed by the status display processing unit 120 by the procedures of FIGS. 5 and 6. A printer name ("Printer ABCD") and the port name ("USB001") of a port to which the printer is connected are described in the parentheses of "Printer Status (Printer ABCD-USB001)" displayed at the top. A message representing a printer status is displayed in a frame below. For example, FIG. 14 shows an example in which a message of an ink runout error is displayed in Japanese and represents that yellow ink of a model number "INK__001_Y" and black ink of a model number "INK__001_Bk" have run out. A "Show Ink Help" button at the lower right portion of the window is used to activate a recording material information help window. When this button is pressed, a help window which describes information on model numbers "INK__001_C", "INK__001_M", "INK__001_Y", and "INK__001_Bk" is displayed. FIG. 15 shows an example in which the language is English (US). FIG. 16 shows an example in which the language is Japanese and the model numbers of recording materials are "INK__002_C", "INK__002_M", "INK__002_Y", and "INK__002_Bk". FIG. 17 shows an example in which the language is Japanese, no compatible recording material information can be acquired, and neither the model numbers of recording materials nor the help display button is displayed.

In these display windows, the contents of display frames 1400, 1500, 1600, and 1700 are determined by the contents of the status, a selected language, and compatible recording material information read out from the printer 101. The remaining contents are created by combining a printer name and port name used with a template read out from a resource file which is determined by a selected language.

<Processing Procedures by Printer Driver>

Figure 4:
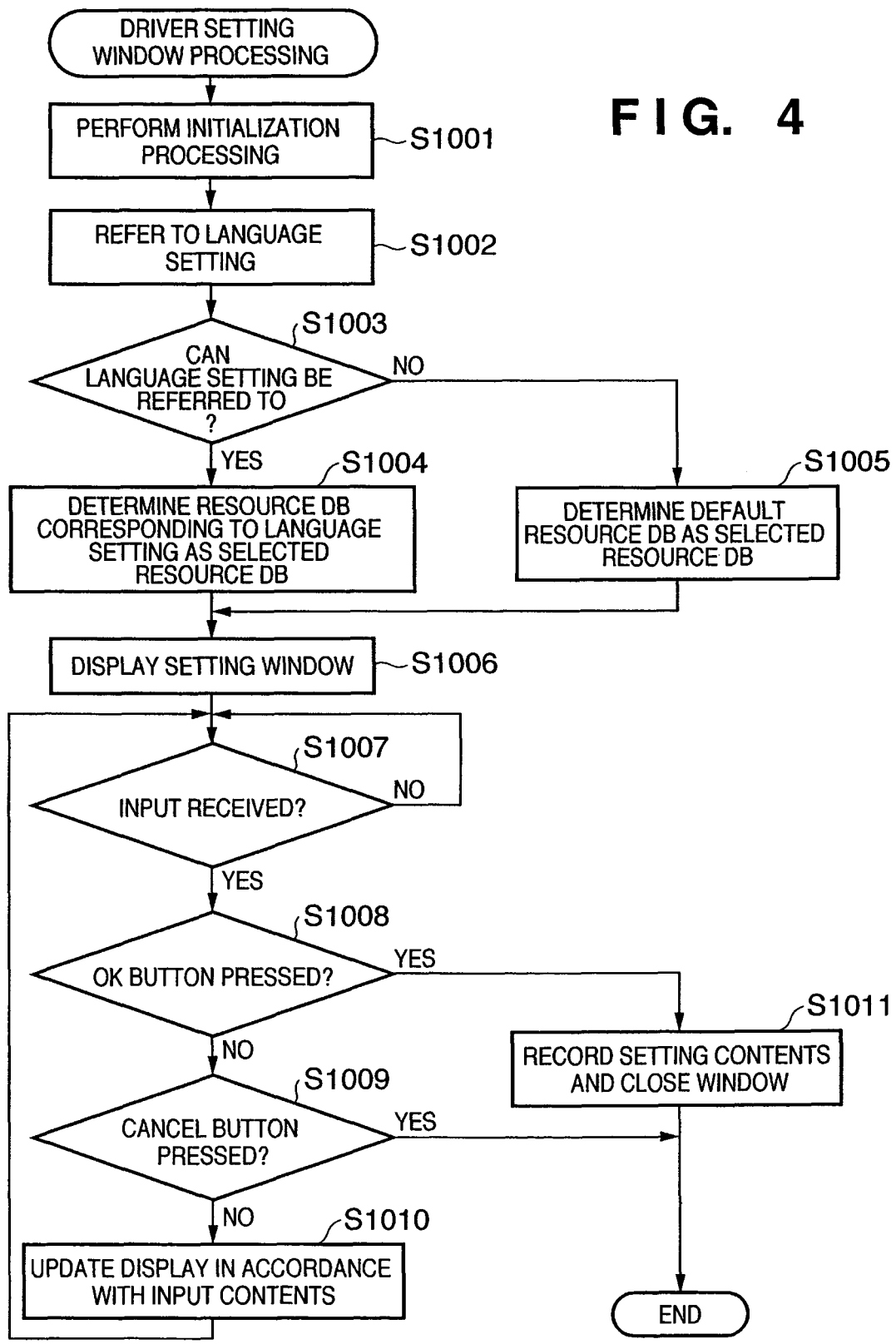
FIG. 4 is a flowchart showing the processing operation of print setting window display processing by the setting window display processing unit of the printer driver shown in FIG. 2B.

FIG. 4 is a flowchart showing display processing of a setting window (i.e., the dialog box 301 in FIG. 3) by setting window display processing of the printer driver 203 by the setting window display processing unit 117 of the printer driver 203.

When display processing of the setting window of the printer driver is called, the setting window is initialized (step S1001). In initialization processing, a memory area necessary for the operation of the setting window is reserved, and previously set contents are read out from the storage device. Then, the language setting in print setting information is referred to (step S1002). In this processing, print setting information is referred to, and a language selected in the language selection area 306 of the setting window display processing unit 117 is referred to. Note that the default language of the language selection area 306 is set to a language corresponding to the locale ID of an operating system. A language in the list of the language selection area 306 in the window of FIG. 3 can be changed to one selected by the user. If the language can be referred to, i.e., information representing the language is saved (S1003—YES), the flow advances to step S1004. In step S1004, the reference result is checked against the language-file correspondence information shown in FIG. 8, and a resource database file corresponding to the selected language is determined as a resource database file used for display in setting window display processing. The resource database file used for display in setting window display processing will be called a selected resource DB. If no language information can be referred to in step S1002, for example, if no significant information corresponding to the language is saved (S1003—NO), a predetermined default resource database file is set as a selected resource DB (S1005). In the embodiment, Japanese is selected as a language, and a corresponding resource database file RES_JP-.DLL is selected as a selected resource DB.

In step S1006, a setting window as shown in FIG. 3 is displayed. In display, a resource template (e.g., display layout information), a character string resource (e.g., standard character string), and the like are acquired from a file (selected resource DB) determined as a resource database file used in setting window display processing. Immediately after activation, contents saved in print setting information are displayed.

Processing from steps S1007 to S1011 is to update the display and settings in accordance with a user input. Step S1007 is processing of waiting for a user input. If an input is received, processing is done in accordance with whether the input is press of the OK button (step S1008), press of the cancel button (step S1009), or another control operation. If the OK button is pressed (S1008—YES), the flow advances to step S1011 to record contents displayed in the respective selection areas at this time as the latest setting contents and update the print setting information. Then, the setting window is closed to end setting window processing. If the cancel button is pressed (S1009—YES), the setting window is closed to end setting window processing without updating the setting contents. If another operation is performed, the display contents of the respective selection areas are updated in accordance with input contents, i.e., setting contents are temporarily saved. At this time, no changed contents are reflected in the setting contents, and only the display is updated. A series of processes from step S1007 are repetitively executed until the OK button or cancel button is pressed.

By the above procedures, the contents of print setting information can be updated. By these procedures, for example, the language can be selected.

FIG. 5 is a flowchart showing processing by the status display processing unit 120 of the printer driver 203. When the status display processing unit 120 is activated, it is initialized (step S2001). The status display unit is activated upon reception of status information representing the status of the printer 101 from the printer 101. In initialization processing, a memory area necessary for the operation of the setting window is reserved, and the attribute of the window is registered in the OS.

Then, the language setting is referred to (step S2002). In this processing, a language selected in the language selection area 306 of the setting window display processing unit 117 is referred to. This procedure is the same as step S1002 in FIG. 4. If the language can be referred to (S2003—YES), the flow advances to step S2004, and the reference result is checked against the language-file correspondence information shown in FIG. 8 to determine a resource database file used in status display processing, i.e., a selected resource DB corresponding to the language. In step S2008, the language setting referred to in step S2002 is checked against the language-file correspondence information shown in FIG. 8 to acquire the name of a recording material information help file corresponding to the language. The recording material information help file of the acquired name is a selected help file used in recording material information help window display processing. If no language information can be referred to in step S2002 (S2003—NO), a default resource database file is set as a selected resource DB (S2005). In the embodiment, a resource database file RES_JP.DLL in Japanese is set as a selected resource DB. In step S2005, a recording material information help file corresponding to the default language may be set as a selected help file.

In step S2013, a status display window as shown in FIGS. 14 to 17 is displayed. A message-specific part (i.e., contents in the display frame 1400 or the like) is not displayed at this stage. For example, in FIG. 14, only the display frame, and a field 1401 containing the character string "printer status", printer name, and port name are displayed. In display, a resource template, character string resource, and the like are acquired from a selected resource DB file determined in step S2004 or S2005.

In step S2006, compatible recording material information is acquired. The compatible recording material information is acquired from the printer 101 by the monitoring unit 118 in installing the printer driver and upon the completion of print processing, and is recorded in the registry of the data processing apparatus 102. The monitoring unit 118 acquires the device ID of the printer 101, recognizes compatible recording material information (shown in FIG. 7) in the device ID, and records it in the registry. If compatible recording material information of the printer 101 can be acquired in step S2006 (S2007—YES), the flow advances to step S2009 to display a recording material information help display button (e.g., 1402 in FIG. 14) (step S2009), and then to step S2010. When the help button is pressed to activate a recording material information help in status display processing, a help file corresponding to the compatible recording material information acquired in step S2006 among recording material information help files selected in step S2008 is activated. In response to this, a help window is displayed. For example, if the selected language is French, the selected help file name is INK_HELP_FR.HLP. If the acquired compatible recording material information is REG2, a help file REG2_INK_HELP_FR.HLP uniquely specified by the help file name and compatible recording material information is executed to display a help window. In addition, for example, a help window may be displayed in accordance with compatible recording material information in the help file.

If no compatible recording material information can be acquired in step S2006, the flow advances to step S2010 without determining any recording material information help file or displaying any recording material information help display button.

Processes in steps S2010 and S2011 are repetitively executed until it is determined in step S2010 that a status display end request is received from the user. In step S2011, status information is acquired from the printer, and a message corresponding to the status information is displayed in the status display window. Details of status display processing will be explained with reference to FIG. 6. If an end request to the status display processing unit is received, the flow advances to step S2012 to free the reserved memory area, close the status display window, and end the processing.

FIG. 6 is a flowchart showing details of status display processing (step S2011) by the status display processing unit 120 of the printer driver 203.

Status information is acquired from the printer (step S3001). The status information is acquired from the printer 101 by accessing the I/F control unit 110 of the data processing apparatus 102 by the monitoring unit 118 via the data communication processing unit 119. The status information is notified in the format as shown in FIG. 10. If no status information can be acquired (S3002—No), the status display processing ends.

If status information is acquired (S3002—YES), its contents are analyzed, and a message ID associated with the status information to be displayed is determined by looking up to the status ID table in FIG. 12 (step S3003). The status display processing unit 120 stores a message ID corresponding to printer status information in the form of the status ID table shown in FIG. 12. The resource database stores a message character string table which makes a message ID and message character string correspond to each other, as shown in FIGS. 13A and 13B. A message character string to be displayed can be obtained by referring to the resource database file, particularly, the message character string table on the basis of the message ID. The display message may be formed from a plurality of message IDs. In this case, message character strings corresponding to message IDs are linked in a predetermined order and displayed.

In step S3004, it is determined whether the message ID which is obtained in step S3003 and associated with status information is different from a message ID associated with status information of the currently displayed status. The message ID associated with the currently displayed status information is saved in a specific storage location. If the two message IDs coincide with each other, it is determined that no display need be updated, and the status display processing ends. If the message ID obtained in step S3003 is different from the message ID associated with status information of the currently displayed status, the flow advances to step S3005.

In step S3005, a message character string corresponding to the status information-associated message ID is acquired by referring to a selected resource DB file determined in step S2004 or S2005, particularly, the message character string table in FIG. 13A or the like. The message character string corresponding to the status information-associated message ID is a status-associated message character string. It is determined whether the status is to display the model number of a recording material (step S3006). Whether the status is a status to display the model number of a recording material is managed by a status information-associated message ID. For example, a table which represents, in correspondence with a message ID, whether a message requires display of the model number of a recording material is prepared in the printer driver. By looking up to the table, it can be determined from the message ID determined in step S3003 whether to display the model number of a recording material in the message. More specifically, if the message ID falls within a range of 1001 (inclusive) to 1999 (exclusive), it is determined that the message is to display the model number of a recording material. On the basis of the value at the least significant digit of the message ID, it can be determined what number of a message ID in the table of FIG. 11 is to be employed as the message ID of the recording material character string. That is, a message ID whose value at the least significant digit coincides with that of the message ID determined in step S3003 is selected from the table. Even if it is determined in step S3006 that the message ID represents a message to display the model number of a recording material, no recording material model number information is contained in the message character string acquired from the resource database file in step S3005. Thus, compatible recording material model number information to be displayed is determined in step S3007 and subsequent steps.

If it is determined in step S3006 that the model number of a recording material should be displayed, the flow advances to step S3007 to acquire compatible recording material information from the registry. As described above, the compatible recording material information is recorded in the registry of the data processing apparatus 102 by the monitoring unit 118 in installing the printer driver and upon the completion of print processing. The monitoring unit 118 acquires the device ID of the printer 101, recognizes compatible recording material information (shown in FIG. 7) in the device ID, and records it in the registry. Note that compatible recording material information may be acquired from the printer 101, as needed, without recording it in the registry.

In step S3008, it is determined whether the compatible recording material information of the printer 101 has been acquired in step S3007. If the compatible recording material information has been acquired, the flow advances to step S3009, and the recording material ID table shown in FIG. 11 is looked up, and the message ID of a recording material character string is acquired from the compatible recording material information and the status information-associated message ID. Further, a message character string corresponding to the message ID of the recording material character string is acquired by looking up to the message character string table in FIGS. 13A and 13B (step S3009). The compatible recording material-associated message character string (i.e., recording material character string) is composited with the status information-associated message character string acquired in step S3005 to obtain a final display message character string (step S3010).

For example, message character strings are composited as follows. Assume that message character strings acquired from the resource database file in step S3005 are three character strings "The following ink tanks have run out. [line feed]", "Yellow [line feed]", and "Black [line feed]". The character string "The following ink tanks have run out. [line feed]" corresponds to a message ID "0001"; the character string "Yellow [line feed]", to a message ID "1003"; and the character string "Black [line feed]", to a message ID "1004". Since the message ID of the first character string does not fall within a range of 1000 to 1999, the corresponding message character string is directly displayed. Then, the character string of the message ID "1003" is displayed. It can be determined from the message ID that this character string is to display a recording material model number character string. Hence, a compatible recording material-associated message ID is acquired by looking up to the recording material ID table in FIG. 11. In this example, compatible recording material information is "REG1", the least significant digit of the message ID is "3", and thus a message ID "11103" is obtained. A recording material model number character string "INK_001_Y" corresponding to the message ID is acquired from the message character string table of the resource database, parenthesized, and inserted before the line feed character. As for the character string of the message ID "1004", a recording material model number character string "INK_001_Bk" is similarly obtained, parenthesized, and inserted before the line feed character of "Black [line feed]". After that, a composited message is displayed. In this manner, the message character string "The following ink tanks have run out. [line feed] Yellow (INK_001_Y) [line feed] Black (INK_001_Bk) [line feed]" is obtained. A display example of this message is shown in FIG. 14.

The obtained message character string is displayed in the status display window (step S3011). The message character string having a model number corresponding to compatible recording material information of the printer 101 can be displayed.

Similarly, when the language is English (US) and compatible recording material information is "REG1", the display in FIG. 15 is obtained. When the language is Japanese and compatible recording material information is "REG2", the display in FIG. 16 is obtained. In FIGS. 14 to 16, 「インクヘルプ表示」 or "Show Ink Help" is an operation button used to activate a recording material information help file. When this button is pressed, an item corresponding to compatible recording material information acquired in step S2006 in a help file set as a recording material information help file in step S2008 is displayed. When the language is Japanese and no compatible recording material information can be acquired, the display in FIG. 17 is obtained. In this case, no compatible recording material information can be acquired in step S2006, and no recording material information help display button is displayed at the lower right portion of the window.

According to the above-described embodiment, while a window is displayed in a language selected as the language of the printer driver window in the PC 102, recording material model number information can be determined on the basis of compatible recording material information acquired by bi-directional communication with the printer 101, and can be displayed in the window. Thus, model number information of a recording material compatible with the printer 101 can be accurately displayed irrespective of the language used to display a window. An appropriate display can always be provided by a single printer driver regardless of the difference in the model number of a compatible recording material depending on the language or the printer shipping destination. This increases the printer driver creation efficiency.

Note that only display is described as the output in the embodiment, but the present invention can also be applied to printing by replacing "display" with "printing". This also applies to another output method such audio output.

The embodiment has described a recording material as an example of consumables, but the invention according to the embodiment can also be applied to another component of which compatibility with the printer is demanded. For example, the invention according to the embodiment can also be applied to the photosensitive drum of an electrophotographic printer, copying machine, or the like that can be exchanged independently of toner.

The embodiment has described Japanese and Chinese, but can be similarly applied to another language such as Chinese or Korean.

[Modification]

As for status information, no message ID need intervene. For this reason, status information itself in FIG. 12 may be stored instead of message IDs in FIGS. 13A and 13B. In this case, the tables in FIGS. 11 and 12 can be omitted.

In this modification, the table in FIG. 18 is adopted in place of those in FIGS. 11 to 13A. The table in FIG. 18 is prepared for each selectable language. Needless to say, the character string is described in a corresponding language. In FIG. 18, a status character string part 1801 and recording material character string part 1802 may be divided into different tables. The status character string part 1801 saves a message character string corresponding to status information. The recording material character string part 1802 saves a character string representing a recording material for each compatible recording material information. When status information is "INK-OUT: X" (X is one of Y, M, C, and K), a corresponding message character string can be specified from the status character string. At the same time, a character string representing a recording material can be uniquely determined from the recording material character string part 1802 on the basis of separately acquired compatible recording material information and the above-mentioned character "X" contained in the status information. For example, 0 to 2 are made to correspond to REG1 to REG3, respectively, and 0 to 3 are made to correspond to characters Y, M, C, and K corresponding to X, respectively. The values corresponding to REG1 to REG3 are multiplied by (the length of one message character string× 4) in FIG. 18, and the Y, M, C, and K values are multiplied by the length of one message character string. The products are added as an offset to the start address of the recording material character string part 1802, obtaining a recording material character string to be displayed. The determined recording material character string is displayed as a character string representing the model number of a recording material, together with a status character string.

The table which makes status information and message character strings correspond to each other, and the table which makes color information of a recording material and the identification name of the recording material for each value of compatible recording material information correspond to each other are prepared for each selectable language. With these tables, a message can be displayed (or printed) in a selected language, and the model number of a recording material can be displayed in accordance with the shipping destination area of a printer.

When the notation of the model number of a recording material is independent of the language, the recording material character string part 1802 need not be prepared for each language, and only one recording material character string part 1802 suffices.

The embodiment has exemplified a recording material, but the present invention can also be applied to consumables and components other than the recording material.

<Other Embodiments>

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-193087 filed on Jun. 30, 2005, which is hereby incorporated by reference herein in its entirety.

What is claimed is:

1. An information processing apparatus capable of communicating with a printer that stores recording material information corresponding to a shipping destination of the printer in advance among recording material information prepared for respective shipping destination areas, comprising:

a storage unit configured to store message IDs of respective status and message IDs of ink cartridges prepared for the recording material information, wherein the message IDs of ink cartridges are different for different shipping destination areas;

an acquisition unit configured to refer a resource database file corresponding to a language setting in accordance with a reception of a status indicating run-out of remaining ink sent from the printer when an ink of a specific ink cartridge has run out, and acquire a message corresponding to a message ID of the status indicating run-out of remaining ink and model number information of the ink corresponding to the message ID of the specific ink cartridge, wherein the message ID of the specific ink cartridge is linked with the model number information of an ink cartridge corresponding to a shipping destination area of the printer, and the message ID of the specific ink cartridge is a message ID specified based on the recording material information of the printer and color information of the specific ink cartridge; and a display unit configured to display a message indicating run-out of remaining ink specified by the model number information of the ink based on the message acquired by the acquisition unit and the model number information of the ink.

2. The apparatus according to claim 1, wherein the specific ink cartridge is at least one of ink cartridges of cyan, magenta, yellow and black.

3. An information processing method that is performed by an information processing apparatus capable of communicating with a printer that stores recording material information corresponding to a shipping destination of the printer in advance among recording material information prepared for respective shipping destination areas, said method comprising:

storing message IDs of respective status and message IDs of ink cartridges prepared for the recording material information, wherein the message IDs of ink cartridges are different for different shipping destination areas;

referring a resource database file corresponding to a language setting in accordance with a reception of a status indicating run-out of remaining ink sent from the printer when an ink of a specific ink cartridge has run out, and acquiring a message corresponding to a message ID of the status indicating run-out of remaining ink and model number information of the ink corresponding to the message ID of the specific ink cartridge, wherein the message ID of the specific ink cartridge is linked with the model number information of an ink cartridge corresponding to a shipping destination area of the printer, and the message ID of the specific ink cartridge is a message ID specified based on the recording material information of the printer and color information of the specific ink cartridge; and displaying a message indicating run-out of remaining ink specified by the model number information of the ink based on the message acquired at the acquiring and the model number information of the ink.

4. The method according to claim 3, wherein the specific ink cartridge is at least one of ink cartridges of cyan, magenta, yellow and black.

5. A non-transitory computer readable medium in which a program is stored for causing a computer to perform an information processing method, the computer being capable of communicating with a printer that stores recording material information corresponding to a shipping destination of the printer in advance among recording material information prepared for respective shipping destination areas, said method comprising:

storing message IDs of respective status and message IDs of ink cartridges prepared for the recording material information, wherein the message IDs of ink cartridges are different for different shipping destination areas;

referring a resource database file corresponding to a language setting in accordance with a reception of a status indicating run-out of remaining ink sent from the printer when an ink of a specific ink cartridge has run out, and acquiring a message corresponding to a message ID of the status indicating run-out of remaining ink and model number information of the ink corresponding to the message ID of the specific ink cartridge, wherein the message ID of the specific ink cartridge is linked with the model number information of an ink cartridge corresponding to a shipping destination area of the printer, and the message ID of the specific ink cartridge is a message ID specified based on the recording material information of the printer and color information of the specific ink cartridge; and displaying a message indicating run-out of remaining ink specified by the model number information of the ink based on the message acquired at the acquiring and the model number information of the ink.

6. The non-transitory computer readable medium according to claim 5, wherein the specific ink cartridge is at least one of ink cartridges of cyan, magenta, yellow and black.

* * * * *